US 9,639,179 B2

United States Patent
Armstrong-Muntner

(10) Patent No.: US 9,639,179 B2
(45) Date of Patent: May 2, 2017

(54) FORCE-SENSITIVE INPUT DEVICE

(75) Inventor: Joel S. Armstrong-Muntner, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 13/620,044

(22) Filed: Sep. 14, 2012

(65) Prior Publication Data
US 2014/0078070 A1 Mar. 20, 2014

(51) Int. Cl.
G06F 3/033 (2013.01)
G06F 3/0354 (2013.01)
G06F 3/044 (2006.01)

(52) U.S. Cl.
CPC .......... *G06F 3/03545* (2013.01); *G06F 3/044* (2013.01)

(58) Field of Classification Search
CPC .......... G06F 3/033; G06F 3/041; G06F 3/044; G06F 3/046; G06F 3/03545; G09G 1/00; G09G 5/00; G08C 21/00; G01R 27/26; G06K 11/06
USPC ..... 178/18, 18.06, 19.04; 324/686; 340/706; 345/174, 179; 401/103
See application file for complete search history.

(56) References Cited

U.S. PATENT DOCUMENTS

| | | | |
|---|---|---|---|
| 4,318,096 A * | 3/1982 | Thornburg et al. ........... | 345/179 |
| 4,695,680 A | 9/1987 | Kable | |
| 4,761,089 A | 8/1988 | Kurihara et al. | |
| 4,814,552 A | 3/1989 | Stefik et al. | |
| 4,859,080 A | 8/1989 | Titus et al. | |
| 4,883,926 A * | 11/1989 | Baldwin ..................... | 178/19.01 |
| 5,247,137 A | 9/1993 | Eppeerson | |
| 5,434,371 A | 7/1995 | Brooks | |
| 5,581,052 A | 12/1996 | Padula et al. | |
| 5,600,348 A | 2/1997 | Bartholow et al. | |
| 5,736,687 A | 4/1998 | Sellers | |
| 5,831,601 A | 11/1998 | Vogeley et al. | |
| 5,914,708 A | 6/1999 | LaGrange et al. | |
| 6,050,735 A | 4/2000 | Hazzard | |
| 6,081,261 A | 6/2000 | Wolff et al. | |
| 6,130,666 A | 10/2000 | Persidsky | |
| 6,188,392 B1 | 2/2001 | O'Connor et al. | |
| 6,650,320 B1 * | 11/2003 | Zimmerman ................ | 345/179 |

(Continued)

FOREIGN PATENT DOCUMENTS

GB 2445362 7/2008
KR 20030035305 5/2003

OTHER PUBLICATIONS

U.S. Appl. No. 12/683,255, filed Jan. 6, 2010, Pance.

(Continued)

*Primary Examiner* — Nicholas Lee
*Assistant Examiner* — Abdul-Samad A Adediran
(74) *Attorney, Agent, or Firm* — Zachary D. Hadd; Kendall W. Abbasi

(57) ABSTRACT

An input device for computing devices that include touch screens. The input device includes an outer housing having an inner surface and an inner shaft. The inner shaft is at least partially received within the outer housing. A nib is operatively coupled to the inner shaft. Providing a first force to the nib causes the inner shaft to contact the inner surface of the outer housing at a first contact point along the outer housing, and providing a second force to the nib causes the inner shaft to contact the inner surface of the outer housing at a second contact point along the outer housing.

23 Claims, 12 Drawing Sheets

(56) References Cited

U.S. PATENT DOCUMENTS

| | | | |
|---|---|---|---|
| 6,717,073 B2 | 4/2004 | Xu et al. | |
| 6,906,703 B2 | 6/2005 | Vablais et al. | |
| 6,914,596 B2 | 7/2005 | Liu et al. | |
| 6,933,933 B2 | 8/2005 | Fleming | |
| 7,027,041 B2 | 4/2006 | Nishimura et al. | |
| 7,064,750 B2 | 6/2006 | Duret | |
| 7,068,262 B2 | 6/2006 | Perkins et al. | |
| 7,131,724 B2 | 11/2006 | King et al. | |
| 7,310,091 B2 * | 12/2007 | Liu et al. | 345/179 |
| 7,322,662 B2 | 1/2008 | Bich et al. | |
| 7,330,590 B2 | 2/2008 | Seto et al. | |
| 7,365,735 B2 | 4/2008 | Reinhardt et al. | |
| 7,477,242 B2 | 1/2009 | Cross et al. | |
| 7,486,823 B2 | 2/2009 | Wang et al. | |
| 7,489,308 B2 | 2/2009 | Blake et al. | |
| 7,511,705 B2 | 3/2009 | Silk et al. | |
| 7,612,767 B1 | 11/2009 | Griffin et al. | |
| 7,646,379 B1 | 1/2010 | Drennan et al. | |
| 7,671,837 B2 | 3/2010 | Forsblad et al. | |
| 7,671,845 B2 | 3/2010 | Keely | |
| 7,842,893 B2 | 11/2010 | Tomiya | |
| 7,976,226 B2 | 7/2011 | Jeon et al. | |
| 8,023,079 B2 | 9/2011 | Chen et al. | |
| 8,063,322 B2 | 11/2011 | Katsurahira | |
| 8,089,474 B2 | 1/2012 | Geaghan et al. | |
| 8,094,325 B2 | 1/2012 | Silverbrook | |
| 8,130,212 B2 | 3/2012 | Umeda | |
| 8,212,795 B2 | 7/2012 | Henry et al. | |
| 8,259,090 B2 | 9/2012 | Chiang et al. | |
| 2002/0067350 A1 | 6/2002 | Ben Ayed | |
| 2002/0158854 A1 | 10/2002 | Ju | |
| 2002/0180714 A1 | 12/2002 | Duret | |
| 2003/0214490 A1 | 11/2003 | Cool | |
| 2004/0140962 A1 | 7/2004 | Wang et al. | |
| 2005/0110777 A1 | 5/2005 | Geaghan et al. | |
| 2005/0110778 A1 | 5/2005 | Ben Ayed | |
| 2005/0156915 A1 | 7/2005 | Fisher | |
| 2005/0162411 A1 | 7/2005 | van Berkel | |
| 2006/0087496 A1 | 4/2006 | Maciejewski | |
| 2006/0139338 A1 | 6/2006 | Robrecht et al. | |
| 2007/0076953 A1 | 4/2007 | Gonzalez et al. | |
| 2007/0085842 A1 | 4/2007 | Pilu | |
| 2007/0123165 A1 | 5/2007 | Sheynman et al. | |
| 2007/0188477 A1 | 8/2007 | Rehm | |
| 2007/0236474 A1 | 10/2007 | Ramstein | |
| 2007/0285405 A1 | 12/2007 | Rehm | |
| 2008/0036734 A1 | 2/2008 | Forsblad et al. | |
| 2008/0150917 A1 | 6/2008 | Libbey et al. | |
| 2008/0150921 A1 | 6/2008 | Robertson et al. | |
| 2008/0278443 A1 | 11/2008 | Schelling et al. | |
| 2008/0309621 A1 | 12/2008 | Aggarwal et al. | |
| 2009/0009489 A1 | 1/2009 | Lee | |
| 2009/0032313 A1 | 2/2009 | Silverbrook et al. | |
| 2009/0036176 A1 | 2/2009 | Ure | |
| 2009/0115431 A1 * | 5/2009 | Philipp | 324/686 |
| 2009/0167702 A1 | 7/2009 | Nurmi | |
| 2009/0236153 A1 | 9/2009 | Kyung et al. | |
| 2009/0251338 A1 | 10/2009 | Marggraff et al. | |
| 2009/0314552 A1 * | 12/2009 | Underwood et al. | 178/19.04 |
| 2010/0006350 A1 * | 1/2010 | Elias | 178/18.06 |
| 2010/0051356 A1 * | 3/2010 | Stern et al. | 178/19.04 |
| 2010/0170726 A1 | 7/2010 | Yeh et al. | |
| 2010/0271312 A1 | 10/2010 | Alameh et al. | |
| 2010/0315384 A1 | 12/2010 | Hargreaves et al. | |
| 2011/0162894 A1 | 7/2011 | Weber | |
| 2011/0164000 A1 | 7/2011 | Pance | |
| 2011/0221712 A1 | 9/2011 | Liang | |
| 2011/0273376 A1 | 11/2011 | Dickinson et al. | |
| 2011/0285670 A1 * | 11/2011 | Li et al. | 345/179 |
| 2011/0291986 A1 | 12/2011 | Rebeschi et al. | |
| 2012/0062497 A1 | 3/2012 | Rebeschi et al. | |
| 2012/0098798 A1 | 4/2012 | Lee | |
| 2012/0113065 A1 | 5/2012 | Chin | |
| 2012/0127110 A1 | 5/2012 | Amm et al. | |
| 2012/0228039 A1 | 9/2012 | Hinson et al. | |
| 2013/0009907 A1 * | 1/2013 | Rosenberg et al. | 345/174 |
| 2013/0050080 A1 | 2/2013 | Dahl et al. | |
| 2013/0135220 A1 | 5/2013 | Alameh et al. | |
| 2014/0028633 A1 * | 1/2014 | Mercea | G06F 3/033 345/179 |
| 2014/0078109 A1 | 3/2014 | Armstrong-Muntner | |

OTHER PUBLICATIONS

U.S. Appl. No. 12/683,287, filed Jan. 6, 2010, Weber.
U.S. Appl. No. 12/950,848, filed Nov. 19, 2010, Amm et al.
U.S. Appl. No. 13/620,177, filed Sep. 14, 2012, Armstrong-Muntner.

* cited by examiner

FORCE-SENSITIVE INPUT DEVICE

TECHNICAL FIELD

The present invention relates generally to computing devices, and more specifically, to input devices for computing devices.

BACKGROUND

Many types of input devices may be used to provide input to computing devices, such as buttons or keys, mice, trackballs, joysticks, touch screens and the like. Touch screens, in particular, are becoming increasingly popular because of their ease and versatility of operation. Typically touch screens on interfaces can include a touch sensor panel, which may be a clear panel with a touch-sensitive surface, and a display device that can be positioned behind the panel so that the touch-sensitive surface substantially covers the viewable area of the display device. Touch screens allow a user to provide various types of input to the computing device by touching the touch sensor panel using a finger, stylus, or other object at a location dictated by a user interface being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can be formed from a matrix of row and column traces, with sensors or pixels present where the rows and columns cross over each other while being separated by a dielectric material. Each row can be driven by a stimulation signal, and touch locations can be identified through changes in the stimulation signal. Typically, a touch location is sensed based on an interference of the stimulation signal, such that a touch location may correspond to a location where the stimulation signal is the weakest. In some instances it may be desirable for a user to provide input to the touch screen with an input device other than the user's finger or fingers. Some input devices, such as styli, allow a user to use the input device as a pen or pencil and "write" on the touch screen. However, depending on the mode of operation of the touch sensor panels, the computing device may not be able to detect certain characteristics of the input stimulation provided by the user through the stylus. For example, in a capacitive-sensing touch screen, the touch sensor panels may not be able to detect how much force (e.g., pressure) is exerted by the user on the touch screen through the stylus and instead may only be able to detect the presence or absence of the stylus. The user may thus not be able to "write" on the touch screen with as much control as the user would be able to write on paper with a ballpoint pen or other non-electronic writing tool because, for example, the thickness of the lines drawn on a touch screen by the stylus will be uniform regardless of the force exerted by the user.

SUMMARY

One example of the present disclosure may take the form of an input device for computing devices. The input device includes an outer housing having an inner surface. The input device also includes an inner shaft, with the inner shaft at least partially received within the outer housing. The input device also includes a nib operatively coupled to the inner shaft. Providing a first force to the nib causes the inner shaft to contact the inner surface of the outer housing at a first contact point along the outer housing, and providing a second force to the nib causes the inner shaft to contact the inner surface of the outer housing at a second contact point along the outer housing.

Another example of the disclosure may take the form of an apparatus including an inner shaft with an electrically conductive portion. The apparatus also includes a nib operatively coupled to the inner shaft and configured to bias the inner shaft in a first biasing direction within a rigid housing such that the electrically conductive portion of the inner shaft contacts the rigid housing at a first location along a longitudinal axis of the rigid housing.

Another example of the present disclosure may take the form of a stylus for providing an input to a touch interface of a computing device. The stylus includes an elongated body and a nib operably coupled to the elongated body. The stylus also includes an inner shaft operably coupled to the nib and at least partially received within the elongated body. Movement of the nib causes a portion of the inner shaft to bend towards the elongated body.

SPECIFICATION

Overview

In some embodiments herein, an input device having a nib is disclosed. In one embodiment, the input device may take the form of a stylus that may be used to communicate with a display, such as a touch screen or touch interface, of a computing device. The stylus may include a nib or tip, and the stylus may sense various forces exerted on the nib when, for example a user "writes" with the stylus on a tablet computing device. In one embodiment, the stylus includes an outer housing and an inner shaft. The inner shaft is received within the outer housing and is coupled to the nib such that movement on the nib induces movement on the inner shaft. For example, a force exerted on the nib may cause the inner shaft to bend and/or to retract within the outer housing. The bending or sliding of the inner shaft may result in one or more contact points between the inner shaft and the outer housing. Electrical currents and voltages may be manipulated to measure a position of the contact point or points of the inner shaft with the outer housing in order to help determine the magnitude, the direction, or other characteristics of a force provided to the nib, to the stylus, and so forth.

As the point or points of contact vary, the stylus provides varying input signals to the computing device responsive to the changes in the contact points. As a result, a user may be able to change an input to the computing device (e.g., make a line thicker) by merely changing the force applied to the nib of the stylus, similar to what can be done with a ball-point pen or pencil on paper.

Figure 1:
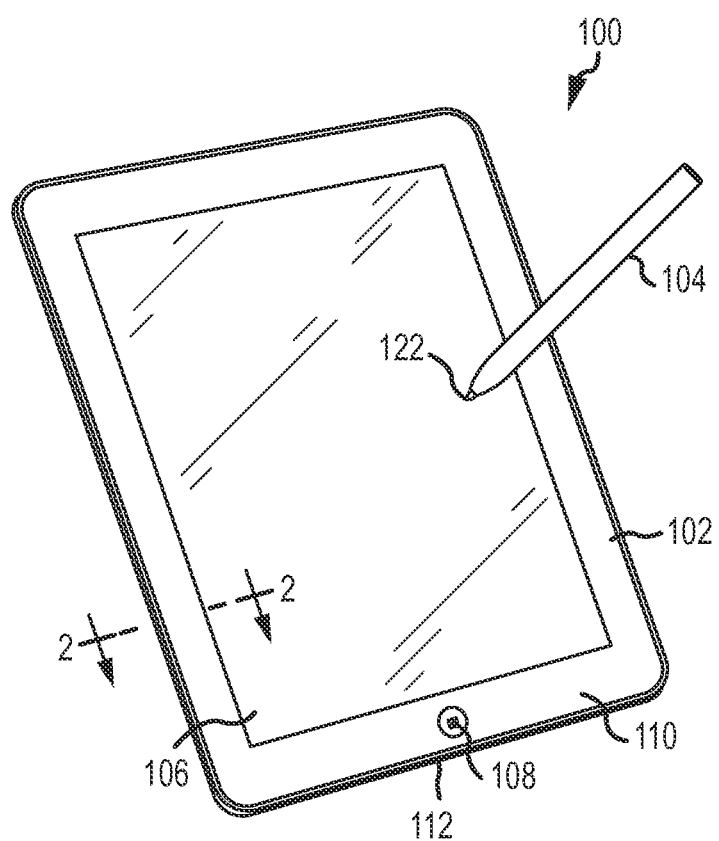
FIG. 1 is a perspective view of a system including a computing device and an input device communicating therewith.

Turning now to the figures, a communication system including a computing device and an input device will be discussed in more detail. FIG. 1 is a perspective view of an input system 100 including a stylus 104 in communication with a computing device 102 through a touch screen 106. The computing device 102 may be substantially any type of electronic device and may include a touch interface or screen 106, which may be a capacitive input mechanism. For example, the computing device 102 may be a laptop computing device, a tablet computing device, a smartphone, a digital music player, portable gaming station, or the like. Although not shown, the computing device 102 may include one or more components of a typical electronic or computing device, such as one or more processing components, to provide control or provide other functions for the device 102. Some illustrative components for operating and communicating with the touch screen 106 are discussed in more detail below with respect to FIGS. 4 and 5.

The computing device 102 may include the touch screen 106, an enclosure 110, and/or one or more input buttons 108. The enclosure 110 encloses one or more components of the computing device 102, as well as may surround and/or secure a portion of the touch screen 106 to the computing device 102. The one or more input buttons 108 may provide input functions to the computing device 102. For example, the input buttons 108 may adjust a volume for the computing device 102, turn the computing device 102 on or off, or may provide other inputs for the computing device 102. Further, the computing device 100 may also include one or more receiving ports 112. The receiving ports 112 may receive one or more plugs or connectors, such as, but not limited to, a universal serial bus (USB) cable, a tip ring sleeve connector, a proprietary connector, a FireWire connector, or the like.

The Touch Screen

Figure 2:
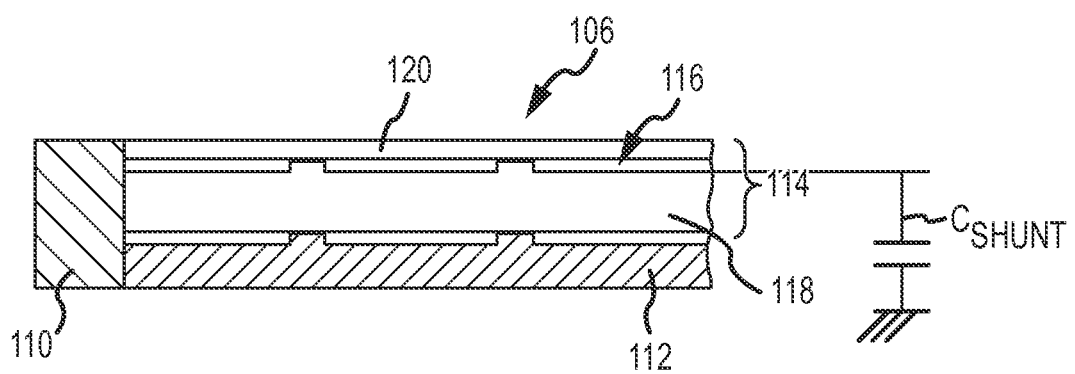
FIG. 2 is a simplified, partial cross-section view of a touch screen of a computing device taken along line 2-2 in FIG. 1.

The touch screen 106 may include one or more sensors in order to detect one or more input signals based on user touches or inputs from a stylus 104 or other input device. Additionally, the touch screen 106 may include a display screen to provide a graphical user interface, and other video and/or image output for the computing device 102. FIG. 2 is a cross-section view of the touch screen 106 taken along line 2-2 in FIG. 1. The touch screen 106 is configured to receive inputs from an object (e.g., location information based on a user's finger or input device), or to sense a location of an object through a change in capacitance at a point touched by an object (or nearly touched by an object), and to send this information to a processor. The touch screen 106 may report touches to one or more processors and the processor interprets the touches in accordance with its programming. For example, the processor may initiate a task in accordance with a particular touch. The touch screen 106 may include a display screen 112 and a sensor panel 114 positioned at least partially over the display screen 112. The display screen 112 is configured to display one or more output images and/or videos for the computing device 102. The display screen 112 may be substantially any type of display mechanism, such as a liquid crystal display (LCD), organic light-emitting diode display, light-emitting diode display, plasma display, or the like. In instances where the display screen 112 is an LCD display, the display screen 112 may include (not shown) various layers such a fluorescent panel, one or more polarizing filters, a layer of liquid crystal cells, a color filter, a pixel array, or the like. It should be noted that FIG. 2 is not drawn to scale and is a sample, partial schematic view of the touch screen. In some embodiments, the touch screen and pixels of the display may be co-planar, while in other embodiments the touch screen may be located above or below the display.

The sensor panel 114 may include an electrode layer 116 operably connected to a sensor glass 118 or other type of support structure. The electrodes 116 may be connected to one or both sides of the sensor glass 118. As one example, the electrodes 116 may be positioned on a first side of the sensor glass 118, and the other side of the glass may be coated to form a ground shield. As another example, the sensor glass 118 may be formed of multiple layers of polyethylene terephthalate (PET), with each layer including electrodes 116 operably connected to one side of the layer, and then each of the layers may be stacked to form rows, columns, and/or shield layers.

With continued reference to FIG. 2, the sensor glass 118 may form a portion of the display screen 112 or may be separate therefrom. The sensor glass 118 may be a relatively clear element that may protect the display screen 112 from forces that may be exerted on the sensor panel 114 by a user or input device. In some embodiments, the sensor glass 118 may be a clear glass panel that may allow the display screen 112 to be viewable therethrough. The electrode layer 116 may include one or more electrodes which may be deposited on the sensor glass 118. For example, the electrode layer 116 may include transparent conductive materials and pattern techniques such as ITO and printing. It should be noted that the electrode layer 116 may include a plurality of electrodes separated by gaps, where the electrodes are interconnected by one or more traces or other electrical elements.

The electrode layer 116 may include one or two layers of electrodes which may be spaced apart across the layer 116. The electrodes, discussed in more detail with respect to FIG. 3, may define one or more nodes 144 that act as capacitive coupling sensors to detect touches on the touch screen 106.

The number and configuration of the nodes 144 may be varied, depending on the desired sensitivity of the touch screen 106.

The touch screen 106 may also include a cover surface 120 disposed over the electrode layer 116. Thus, the electrode layer 116 may be substantially sandwiched between the cover surface 120 and the sensor glass 118. The cover surface 120 protects the other layers of the touch screen 106, while also acting to insulate the electrode layer 116 from external elements (such as fingers or input devices that may contact the cover surface 120). The cover surface 120 may generally be formed from substantially any suitable clear material, such as glass or plastic. Additionally, typically the cover surface 120 should be sufficiently thin to allow for sufficient electrode coupling between the electrode layer 116 and any external input objects (e.g., fingers, input devices). For example, the cover surface 120 may have a thickness ranging between 0.3 to 2 mm.

It should be noted that, in some embodiments, the touch screen 106 may be substantially any type of touch interface. For example, the touch interface may not be see-through and/or may not correspond to a display screen. In these instances, a particular surface or group of surfaces may be configured to receive touch inputs that may or may not correspond to a separately displayed user interface, icons, or the like.

Figure 3:
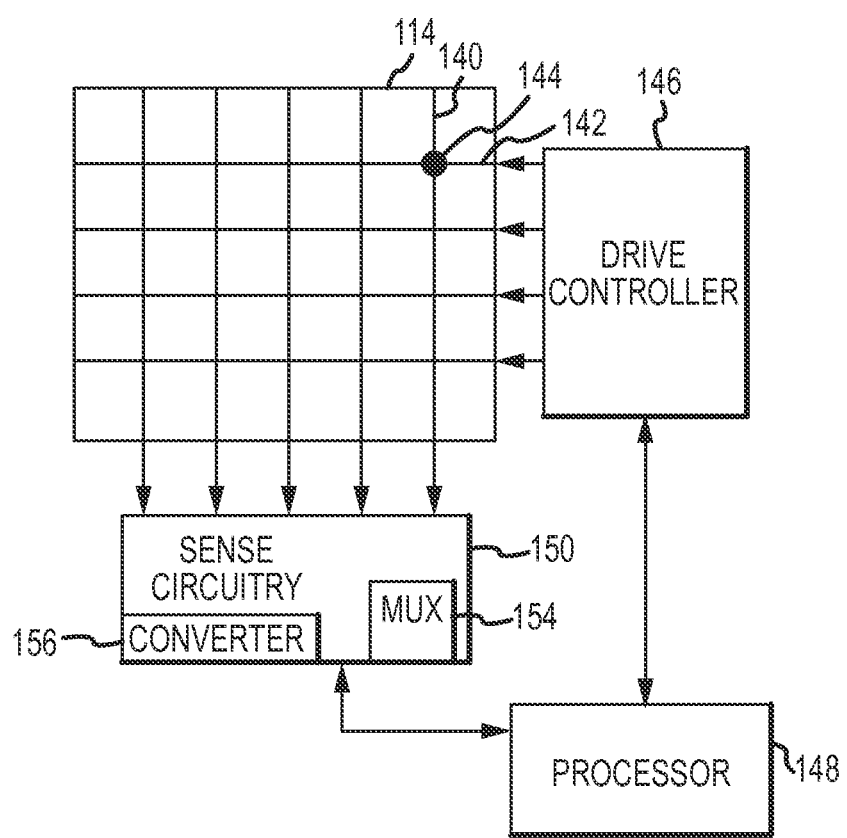
FIG. 3 is a block diagram of a simplified, sample touch-sensing system of the computing device of FIG. 1.

Operation of the touch screen 106 will now be discussed in more detail. FIG. 3 is an illustrative block diagram of the computing device 102 and touch screen 106. The sensor panel 114 of the touch screen 106 may be configured to detect touches on the surface of the touch screen 106 by detecting changes in capacitance at a sensing node 144. With reference to FIG. 3, a sensing node 144 formed by one or more electrodes (explained below) may form a first electrically conductive member and an object, such as a finger of the user or a stylus, may form a second electrically conductive member. The sensor panel 114 of the touch screen 106 may be configured in a self capacitance arrangement or in a mutual capacitance arrangement.

In the self capacitance arrangement, the electrode layer 116 may include a single layer of a plurality of electrodes spaced in a grid or other coordinate system (e.g., Polar) where each electrode may form a node 144. The sensing circuit 150 monitors changes that may occur at each node 144, which typically occurs at a node 144 when a user places an object (e.g., finger or nib 122 of the stylus 104) in close proximity to the electrode.

With continued reference to FIG. 3, in a mutual capacitance system, the electrode layer 116 may include electrodes separated into two layers forming drive lines 142 and sense lines 140. The drive lines 142 may be formed on a first layer of the electrode layer 116 and the sense lines 140 may be formed on a second layer of the electrode layer 116. The nodes 144 for the sensor panel 114 may be defined at locations of the electrode layer 116 where the drive lines 142 may cross the sense lines 140 (although in different layers). The sense lines 140 may intersect the drive lines 142 in a variety of manners. For example, in one embodiment, the sense lines 140 are perpendicular to the drive lines 142, thus forming nodes 144 with x and y coordinates. However, other coordinate systems can also be used, and the coordinates of the nodes 144 may be differently defined.

A drive controller 146 is connected to each of the drive lines 142. The drive controller 146 provides a stimulation signal (e.g., voltage) to the drive lines 142. The sensing circuit 150 is connected to each of the sense lines 140 and the sensing circuit 150 acts to detect changes at the nodes 144. During operation, the stimulation signal is applied to the drive lines 142 and due to the capacitive coupling between the drive lines 142 and sensing rows 140, a current is carried through to the sense lines 140 at each of the nodes 144. The sensing circuit 150 then monitors changes at each of the nodes 144. As with the self-capacitance arrangement, changes in capacitance at the nodes 144 typically occurs when a user places an object such as a finger in close proximity to the node 144 as the object alters the capacitance at the node 144.

In a specific embodiment, each drive line 142 may be driven separately or in groups, such that the drive controller 146 may selectively apply the stimulation signal to drive lines 142. Each drive line 142 or bank of drive lines may be driven sequentially until the entire set of drive lines 142 has been driven. Although the drive lines 142 are driven individually or in groups, the sensing circuit 150 may sense changes along all of the sense lines 140 in parallel. In this manner, the coordinates of a touch node 144 may be more easily determined.

In some embodiments, the drive rows 142 and sensing columns 140 may be co-planar, such that they are not vertically separated. The drive rows 142 may be broken into a series of separate drive elements, each of which is connected to adjacent drive elements by a bus or metal trace. Vias may extend from each drive element to the metal trace, thereby forming a continuous path for an electrical signal.

In either the self-capacitance or mutual capacitance arrangements discussed above, the sensing circuit 150 can detect changes at each node 144. This may allow the sensing circuit 150 to determine when and where a user or the stylus 104 has touched various surfaces of the touch screen 106 with one or more objects. The sensing circuit 150 may include one more sensors for each of the sense lines 140 and may then communicate data to a processor 148. In one example, the sensing circuit 150 may convert the analog signals to digital data and then transmit the digital data to the processor 148. In other examples, the sensing circuit 150 may transmit the analog signals to the processor 148, which may then convert the data to a digital form. Further, it should be noted that the sensing circuit 150 may include individual sensors for each sensing line 140 or a single sensor for all of the sense lines 140. The sensing circuit 150 may report a location of the node 144, as well as changes in capacitance at the node 144.

With reference to FIG. 3, the sensing circuit 150 may also include a multiplexer 154. The multiplexer 154 may be configured to perform time multiplexing for the sense lines 140. For example, the sensing circuit 150 may receive signals from each of the nodes 144 along the sense lines 140 at approximately the same time, the multiplexer 154 stores the incoming signals, and then may release the signals sequentially to the processor 148 one at a time.

The sensing circuit 150 may also include a converter 156. The converter 156 transforms signals from a first signal to a second signal. For example, the converter 156 may transform analog signals to digital signals. As one example, the converter 156 may receive voltage signals from the sense lines 140 which may vary based on the amount of capacitive coupling at each of the nodes 144 and may transform those voltage signals into digital signals.

In some instances, the capacitance at each node 144 of the touch screen 106, and signals sensed by the electrode layer 116 may be responsive in part to the physical geometry of the touch screen 106 and the object (e.g., a hand or a stylus 104) communicating with the touch screen 106. The larger an object is, the larger the differences in capacitance that may be detected upon movement of the object; so increasing the size of the object may increase the touch screen's ability to detect a touch signal by that object. However, the touch screen 106 may not be able to detect changes in force (e.g., pressure) applied to the touch screen through the nib of a stylus because regardless of the force applied, the nib may have a substantially constant size detectable by the touch screen 106.

The Input Device

Figure 4:
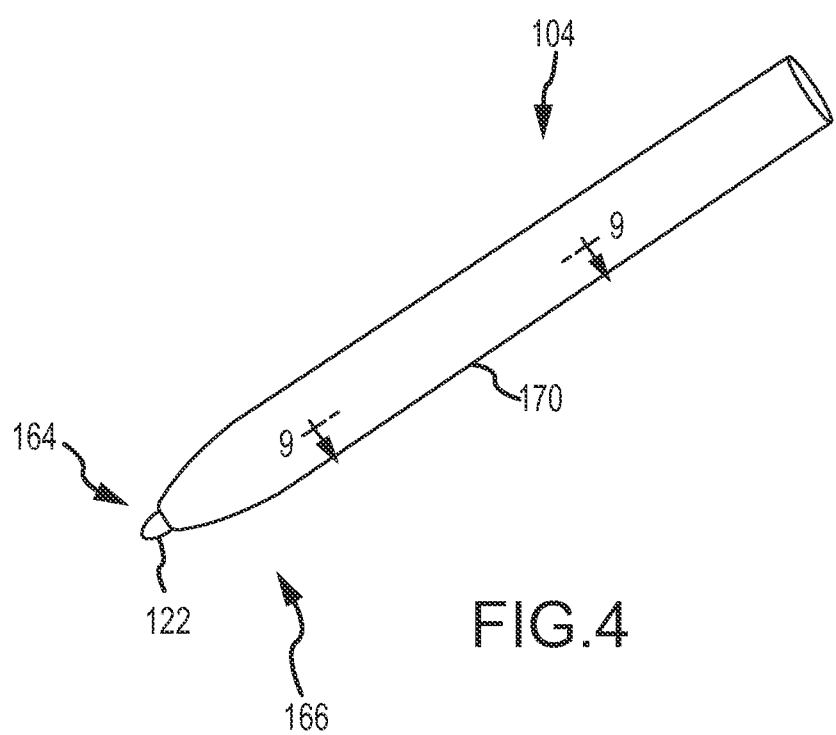
FIG. 4 is a perspective view of an input device having a nib.

Turning now to FIG. 4, the stylus 104 will be discussed in more detail. FIG. 4 is a perspective view of the stylus 104, showing a nib 122. The stylus 104 may include an elongated body defined by an outer housing 170 that may at least partially enclose the nib 122, as well as one or more other components of the stylus 104, such as an inner shaft 180 (described in more detail below and shown in FIGS. 6A-7B, among others). The outer housing 170 may be generally cylindrically shaped, and may taper towards one end 166 of the stylus 104 near the nib 122 in some embodiments as shown in FIG. 4.

The nib 122 may extend through a nib aperture 164 defined on a first end 166 of the stylus 104. The nib 122 may be a generally flexible material that may deform upon force/pressure and resiliently return to its original shape. The nib 122 may be made at least partially of, or covered in, metals such as aluminum, brass or steel, as well as conductive rubber, plastic or other materials doped with conductive particles. In one embodiment the nib 122 may be Mylar, which may by sufficiently conductive to interact with a capacitive touch screen, but may also be flexible. In other embodiments, the nib may be made of, or covered with, non-conductive material so that the stylus 104 can be used with a non-capacitive sensing touch screen 106, such as a resistive sensing touch screen. In general, the nib 122 may have any suitable shape, such as a round shape, a cone shape, a chisel shape, a fine point shape, and so forth.

Figure 6A:
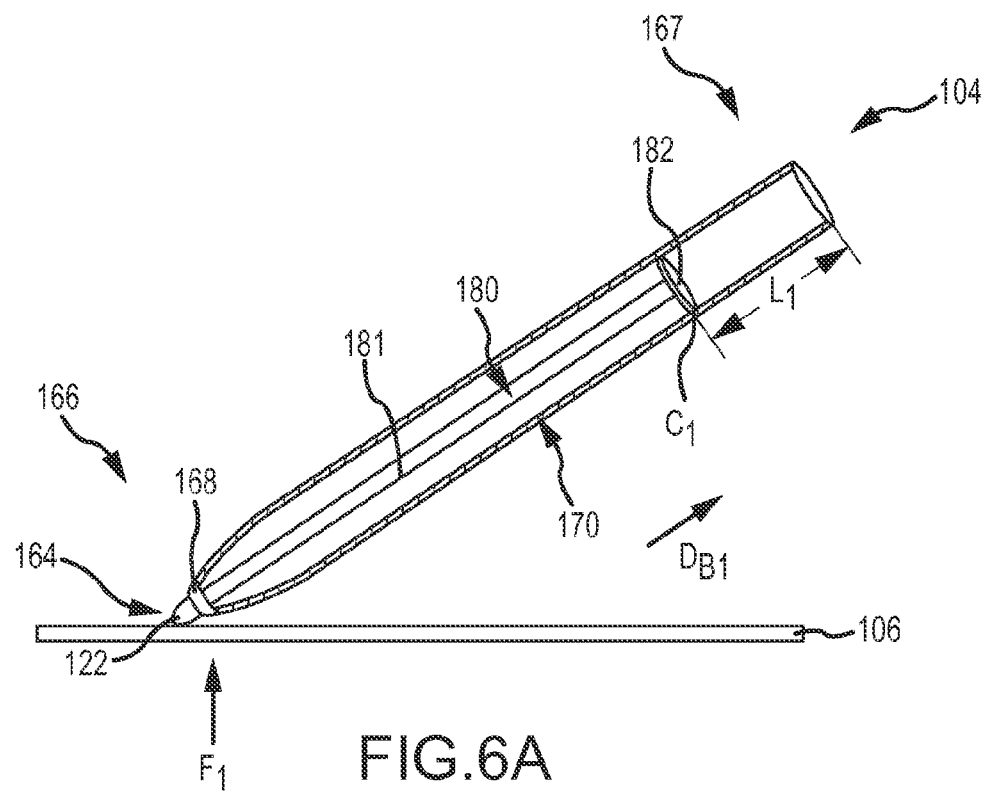
FIG. 6A is a partial cross-section view of a first embodiment of the input device of FIG. 4 with a first force provided to the nib.

The nib 122 may be coupled to the outer housing 170 of the stylus 104 and/or to the inner shaft 180 (described below) of the stylus 104 by a coupling device 168, one example of which is shown in FIG. 6A. In other embodiments, the nib 122 may be decoupled from the outer housing 170 and/or the inner shaft 180. In one example, the nib 122 may be electrically coupled to the outer housing 170 such that charge is shared between the outer surface of the outer housing 170 and the nib 122. Such sharing may facilitate use of the stylus 104 on a capacitive touch screen 106. Also, the nib 122 may be coupled to other components of the stylus 104, such as the inner shaft 180. In some embodiments, the nib 122 is electrically coupled to the outer surface of the outer housing 170 such that charge is shared therebetween, and mechanically coupled to the inner shaft 180 so that movement of the nib 122 induces movement of the inner shaft 180 (including axial and/or radial movement of the inner shaft 180 relative to the outer housing 170). The nib 122 may be electrically isolated from the inner shaft 180 in some embodiments, including those where the inner shaft 180 comprises the nib 122 (e.g., an insulator may separate the nib 122 from the core of the inner shaft 180). The coupling device 168 may be a gimbal-type structure, a ball-point pen coupling structure, or any other suitable coupling structure. At least some of the coupling device may be elastic to allow movement and bending of the various parts of the stylus 104 (e.g., the inner shaft 180).

The nib 122 may be configured to be slid, traced or otherwise moved along the surface of the touch screen 106, and interact therewith. For example, in embodiments where the nib 122 includes a conductive material, the nib 122 may interact with a capacitive sensing touch screen 106 and specifically one or more electrode layers to provide input to the computing device 102. In some embodiments, the nib 122 may be configured to vary an electrical parameter, such as the capacitance at one or more of the nodes 144 of the touch screen 106, which may be converted and provided as an input to the computing device 102. For example, as the nib 122 contacts the surface of the touch screen 106, the touch screen 106 may sense that contact. As the nib 122 interacts with the touch screen 106, one or more nodes 144 may sense the presence of the stylus 104. This may allow the touch screen 106 to be able to detect the presence of the nib 122. The nib 122 may be coupled to the outer housing 170 of the stylus 104 in order to couple capacitance from a user's hand to the nib 122 and vice versa.

Figure 5:
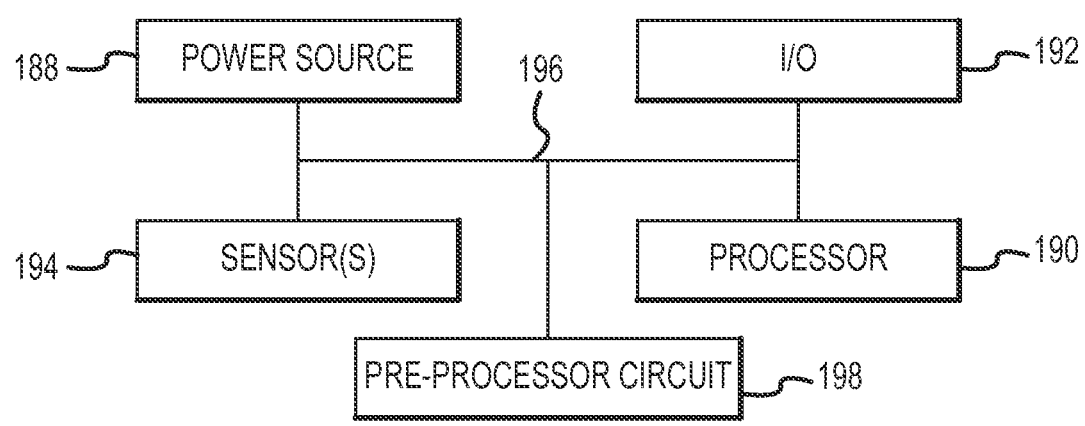
FIG. 5 is a simplified block diagram of the input device of FIG. 4.

With reference now to the simplified block diagram in FIG. 5, the stylus 104 may also include one or more control and/or internal components. The stylus 104 may include a power source 188, a processor 190, an input/output interface 192, and/or one or more sensors 194. In some embodiments, the stylus 104 may also include a pre-processor circuit 198. The electrical components of the stylus 104 may be in communication through one or more buses 196. The power source 188 may provide power to one or more components of the stylus 104. The power source 168 may be a portable power source, such as a battery, or may be a wired power source, such as a communication cord that may be configured to transfer power to the stylus 104 from an external component. Alternatively, the power source may derive power wirelessly from an external component.

The processor 190 may control select functions of the stylus 104. In some embodiments, the processor 190 may determine one or more input signals that are to be transmitted to the touch screen 106 and/or computing device 102, and in these instances, the processor 190 may control the signal transmission from the stylus 104.

The stylus 104 may include an input/output (I/O) interface 192. The I/O interface 192 may receive and/or transmit one or more signals to and from the stylus 104. For example, the I/O interface 192 may receive and/or transmit one or more radio signals (e.g., Bluetooth, WiFi, Zigbee, near field communications, etc.) from and/or to the computing device 102. One example of a signal that the stylus 104 may receive is an "active" signal provided by the computing device 102 when the touch screen 106 is in active use (e.g., a user is viewing content on, or actively controlled the computing device 102 through the touch screen 106). Upon receiving the active signal, the stylus 104 may enter an "active" state and may, for example, sample measurements (described below with reference to FIGS. 9A through 9D) with increased frequency. One example of a signal that the stylus 104 may transmit to the computing device 102 is a "force" signal that is indicative of a force applied to the nib 122 of the stylus 104.

With continued reference to FIG. 5, the stylus 104 may also include one more sensors 194, which may be powered in some embodiments at least in part by the power source 188. In some instances the sensors 194 may be configured to detect one more stimuli of the nib 122, the outer housing 170, or other areas of the stylus 104 such as the inner shaft 180. For example, the one more sensors 194 may include an accelerometer, a gyroscope, a force (e.g., pressure) sensor, and so on. In these instances, certain of the sensors 194, such as an accelerometer and/or gyroscope, may be configured to detect changes in the orientation (e.g., angle) at which a user holds the stylus 104. Other sensors, such as a force or pressure sensor, may be configured to detect a force with which the user presses the nib 122 against the touch screen 106 (several implementations of which are described below with reference to FIGS. 9A through 9O), and so on. The stylus 104 may be configured to change operation responsive to the output of one or more sensors 194. For example, upon detecting that the stylus 104 is oriented in a particular manner (e.g., if an accelerometer determines that a particular surface is oriented "up"), the stylus 104 may provide a different functionality on the touch screen 106 (e.g., provide a wide line type of input to the computing device 102 as opposed to a narrower fine type of input to the computing device 102 when that same surface is oriented "down"). In some embodiments, the functionality may mirror the physical aspects of the stylus. For example, if the nib 122 is chisel-shaped similar to a highlighter, the angle at which it is held may vary the thickness of a line displayed on the display device in response to a sensed touch, accordingly.

The stylus 104 may optionally include a pre-processor circuit 198. The pre-processor circuit 198 may filter or otherwise manipulate data sensed by the sensors 194 before providing the data to the processor 190. For example, the pre-processor circuit 198 may include a diode configured to alternatingly provide a forward-biased signal and a reverse-biased signal to the processor circuit 190, as described in more detail below with reference to FIG. 9C. The pre-processor circuit 198 may include a capacitor in some embodiments, the capacitor configured to be charged and discharged at a rate determined responsive to the sensors 194.

Figure 6B:
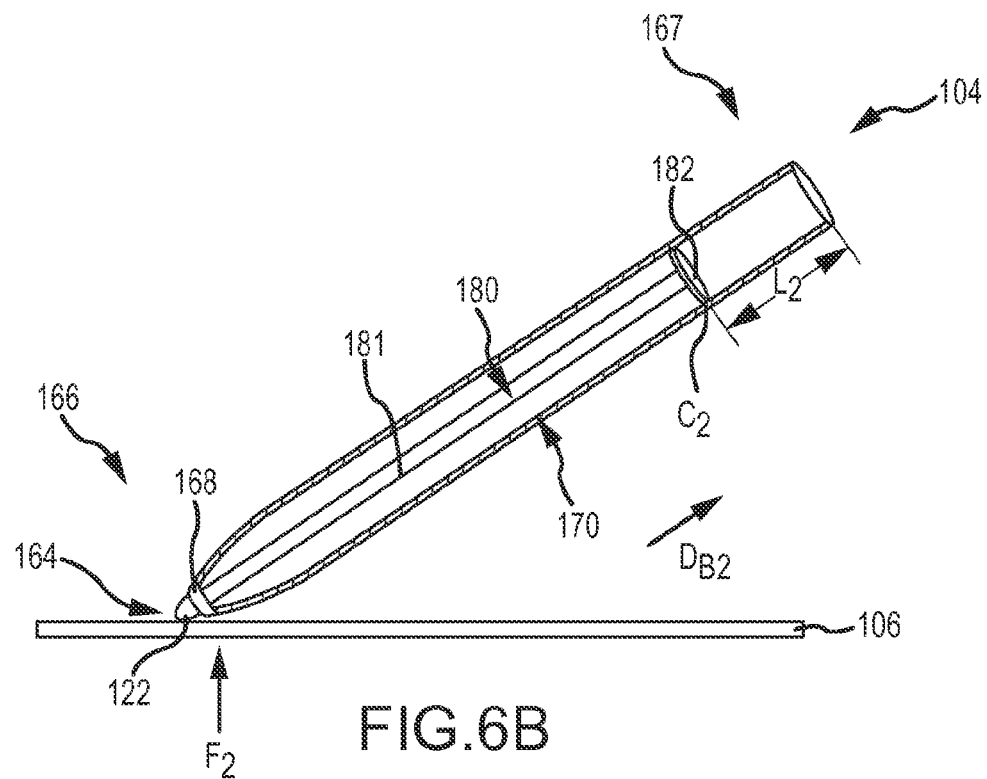
FIG. 6B is a partial cross-section view of a first embodiment of the input device of FIG. 4 with a second force provided to the nib.

With reference to FIGS. 6A and 6B, which are partial cross-section views of a first embodiment of a stylus 104, and also with reference to FIGS. 7A and 7B, which are partial cross-section views of a second embodiment of a stylus 104, the structure and operation of several embodiments of a stylus 104 will now be described.

As mentioned above, the stylus 104 may include an inner shaft 180. The inner shaft 180 may include an outer surface 181, which, as described below with reference to FIGS. 9A through 9D, may be coated with a conductive and/or a resistive material. In some embodiments, the shaft 180 itself may be at least partially composed of a conductive and/or a resistive material. In some but not all embodiments, the shaft may be somewhat elastic—for example the Young's modulus of the inner shaft may be between 0.01 and 1 GPa. In other embodiments, however, the shaft may be rigid.

As illustrated in FIGS. 6A through 7B, in some embodiments the shaft may generally be cylindrically shaped, and may have a top portion 182, which may generally be in the form of a disk. The diameter of at least some portions of the inner shaft 180 may generally be smaller than the diameter of the outer housing; in one example, the diameter of the core of the shaft 180 may only be 20 to 30 percent as great as the diameter of the inner surface of the outer housing 170. The top portion 182 of the shaft 180 may, however, have a diameter that is substantially the same as or slightly less than the diameter of the inner surface of the outer housing 170 such that an electrical connection can be made therebetween. It should be appreciated that the shaft 180 may have different cross-sections in alternative embodiments. The shaft 180 may be square, hexagonal, or the like in different embodiments.

In some embodiments (with reference to FIG. 9B for example), the diameter of the top portion 182 may be greater than the diameter of the inner surface of the outer housing 170 such that the top portion 182 is lodged in the outer housing 170.

It should be noted that the figures are not necessarily drawn to scale. It should also be noted that other sizes, shapes, and configurations of an inner shaft 180 are contemplated. For example, the core of the inner shaft 180 may have a rectangular or triangular cross section in some embodiments. As another example, the inner shaft 180 may not have a top portion 180 in the form of a disk, but may have a different top portion, which may or may not be coupled to the outer housing 170, or may not have a top portion at all.

The inner shaft 180 may be able to measure one or more types of force exerted on the nib 122 of the stylus 104. For example, when a user of the stylus 104 causes the nib 122 to contact the touch screen 106, the nib 122 may experience one or more forces $F_1$, $F_2$ normal to the plane of the touch screen 106. Depending on the angle at which the stylus 104 is held relative to the touch screen 106 and the force applied by the user, the forces may be different, for example a second force $F_2$ may be greater in magnitude than a first force $F_1$. Depending on the composition and configuration of the inner shaft 180, the forces $F_1$, $F_2$ may induce one or more types of movement of the inner shaft 180. It should also be appreciated that a restoring force may be exerted on the nib, for example by the gimbal or other connecting device 168. This nib restoring force may bias the nib (and thus the inner shaft) back to a neutral position in which the shaft does not contact any portion of the outer housing's inner sidewall.

Likewise, an additional force may be exerted normal to the axis of the inner shaft 180 when the inner shaft contacts the sidewall of the outer housing. That is, the housing may exert a shaft restoring force normal to the axis of the inner shaft against the shaft. Likewise, the shaft may exert a force against the housing in the opposite direction; this force may be transmitted through the connecting device 168 from the nib 122. For purposes of clarity, these additional forces are not illustrated although they may be taken into account when modeling and estimating force exerted on the nib, in accordance with embodiments described herein.

For example, with reference to FIGS. 6A and 6B, the forces $F_1$, $F_2$ on the nib 122 may bias the inner shaft axially in biasing directions $D_{B1}$, $D_{B2}$ along the length of the stylus 104. In general, a greater force $F_2$ may bias the inner shaft 180 further up in the outer housing such that a length $L_2$ from the top portion 182 to an end 167 of the stylus 104 is greater than the length $L_1$ from the top portion 182 to the end 167 of the stylus when a lesser force $F_1$ is provided to the nib 122. In other words, the forces may cause the inner shaft 180 to slide within the outer housing 170. With reference to FIGS. 6A and 6B, if the top portion 182 of the inner shaft 180 has a diameter that is substantially the same as, or slightly smaller than the diameter of the inner surface of the outer housing 170, the sliding of the inner shaft 180 within the outer housing 170 may cause the top portion 182 to contact the outer housing 170 at different contact points $C_1$, $C_2$ along the height of the outer housing 170.

Figure 7A:
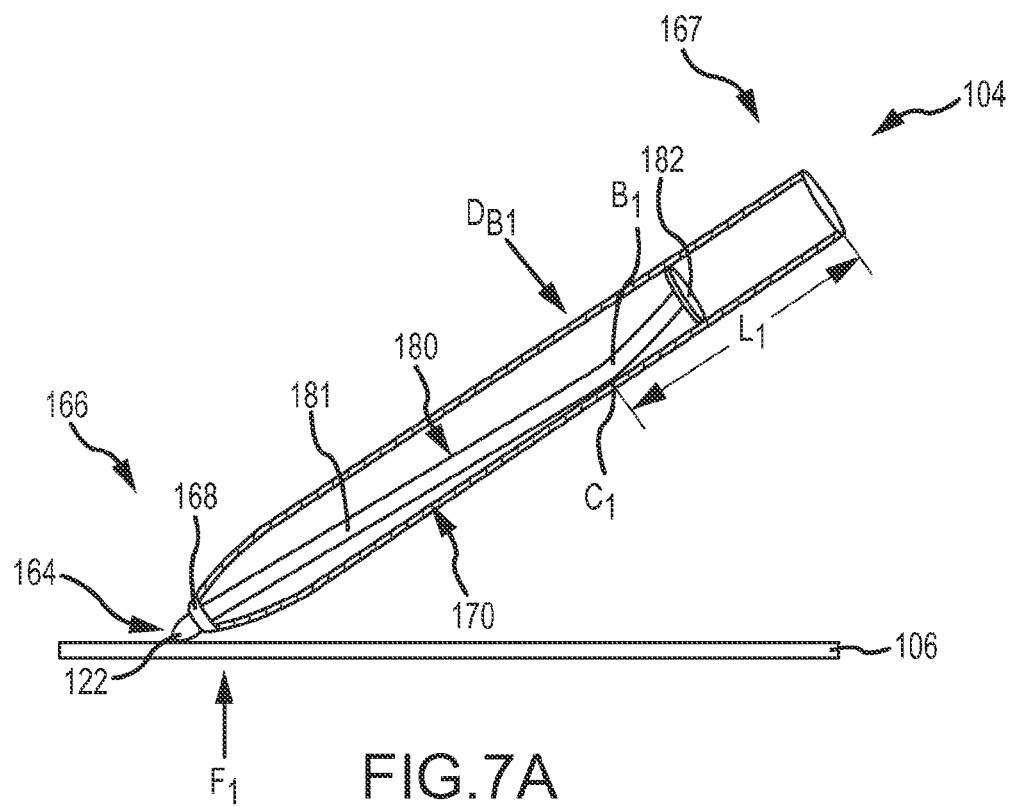
FIG. 7A is a partial cross-section view of a second embodiment of the input device of FIG. 4 with the first force provided to the nib.
Figure 7B:
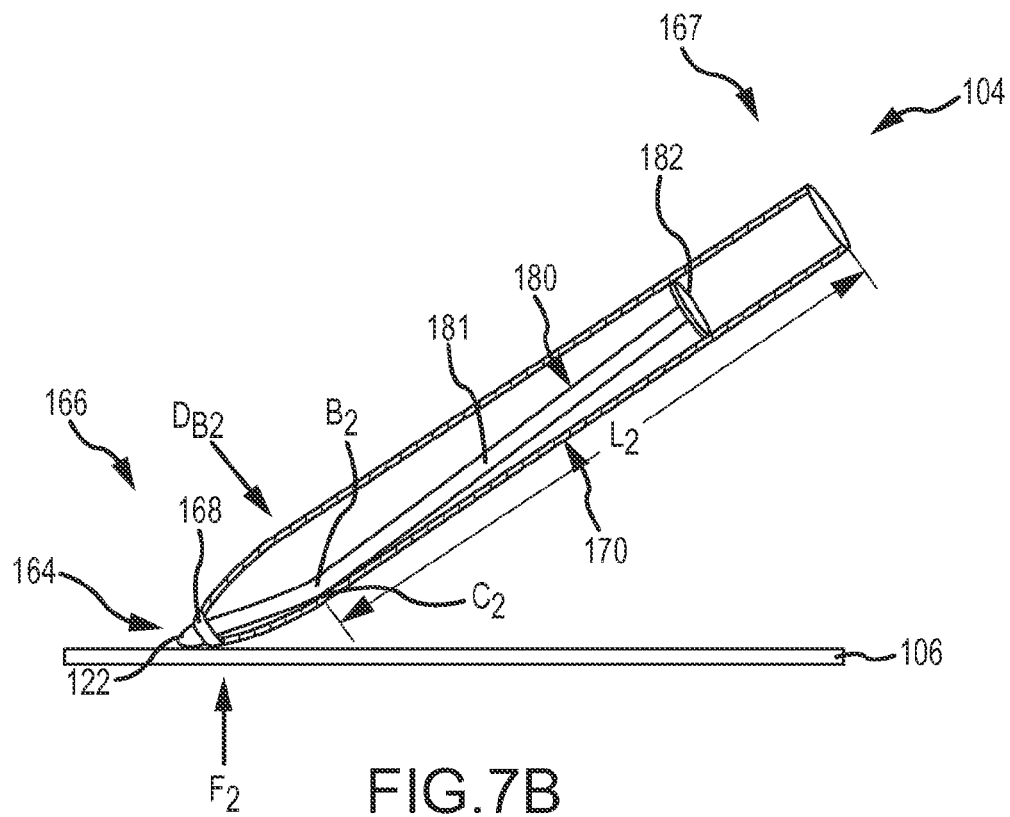
FIG. 7B is a partial cross-section view of a second embodiment of the input device of FIG. 4 with the second force provided to the nib.

As another example, with reference to FIGS. 7A and 7B, the inner shaft 180 may bend in response to a force that a user causes to be exerted on the nib 122. However, depending on the magnitude and direction of the force, the inner shaft 180 may bend differently. For example, a lesser force $F_1$ may cause the shaft to bend in a biasing direction $D_{B1}$ near one end 167 of the outer housing 170, whereas a greater force $F_2$ may cause the shaft to bend in a biasing direction $D_{B2}$ further towards the other end 166 of the outer housing 170. The biasing directions $D_{B1}$, $D_{B2}$ may be the same in some examples, although the location of bending may be different. Specifically, with reference to FIG. 7A, a first, lesser force $F_1$ may cause the inner shaft 180 to bend at one bend point $B_1$, which may in turn cause the inner shaft 180 to contact the inner surface of the outer housing 170 at a first contact point $C_1$. With reference to FIG. 7B, a second force $F_2$ (greater than the first force $F_1$) may cause the inner shaft 180 to bend at a second bend point $B_2$, which may in turn cause the inner shaft 180 to contact the inner surface of the outer housing 170 at a second contact point $C_2$. The distance $L_1$ from contact point $C_1$ to the end 167 of the stylus 104 may be shorter than the distance $L_2$ from contact point $C_2$ to the end 167 of the stylus 104

In general, a force applied to the nib 122 may cause the inner shaft 180 to slide axially within the outer housing 170 (e.g., FIGS. 6A and 6B) and/or may cause the inner shaft 180 to bend towards the outer housing 170 (e.g., FIGS. 7A and 7B). In other words, a force may cause the inner shaft 180 to retract within the outer housing 170 and/or may cause the inner shaft 180 to pivot/hinge/rotate/etc. with respect to the outer housing 170 and/or about the coupling device 168. As described in more detail below with reference to FIGS. 9A through 9D, the contact points $C_1$, $C_2$ of the inner shaft 180 with the outer housing may determine a measurement and/or signal provided by the stylus 104 regarding the force applied to the nib 122.

Whether the inner shaft 180 slides axially within the outer housing 170 and/or whether the inner shaft 180 bends towards the outer housing 170 may depend on, for example, the structure of the inner shaft 180 and the coupling device 168. For example, if the inner shaft 180 is rigid, it may not bend, but may slide axially. As another example, if the inner shaft 180 is at least partially flexible, it may bend, but not slide axially. In still another example, if the inner shaft 180 is at least partially flexible, it may both bend and slide axially within the outer housing 170. As still another example, if the coupling device 168 is a gimbal or ball joint structure, the different forces on the nib 122 may cause the inner shaft 180 to bend, but not to slide axially. However, if the coupling device 168 is a biased gimbal, the inner shaft may both bend and slide axially within the outer housing 170. In general, either one or both of the bending and sliding of the inner shaft 180 may be provided based on the structure of the stylus 104 and the connections between the various components of the stylus.

In some embodiments (not shown in FIGS. 6A through 7B), the inner shaft 180 may be coupled to the outer housing 170 by a biasing member, in order to restore (e.g., re-center, realign, etc.) the inner shaft 180 to a neutral or no-force position. For example, with reference to FIGS. 6A and 6B, a spring may bias the inner shaft 180 towards the other end 166 of the stylus such that when no force is applied, or when a previously applied force is withdrawn, the inner shaft 180 is biased towards a resting position. Alternatively, or in addition to a biasing member, the coupling device 168 may help restore the inner shaft 180 to a neutral position. Furthermore, in some embodiments, such as those illustrated in FIGS. 7A and 7B, the inner shaft 180 may be elastic and may at least in part restore itself to a resting position when no force is applied to the nib 122.

Figure 8A:
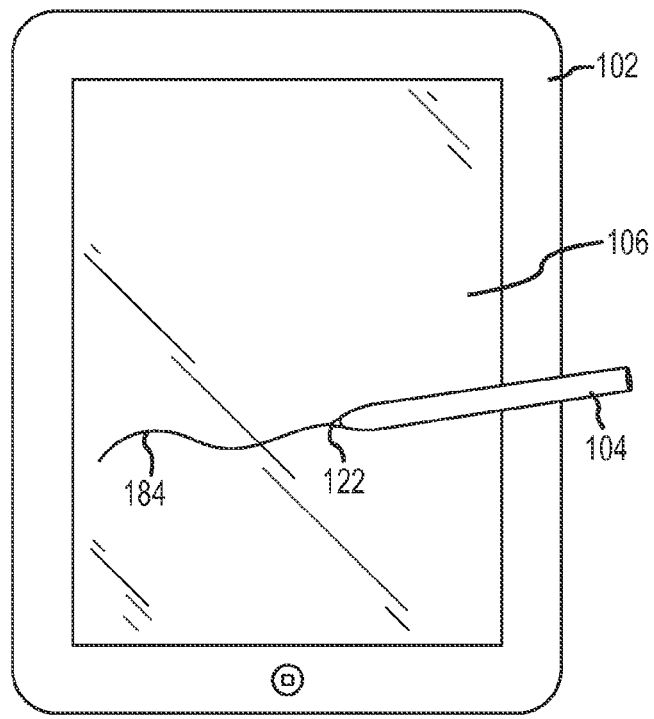
FIG. 8A is a top plan view of a sample computing device receiving an input from the input device with the first force provided to the nib.
Figure 8B:
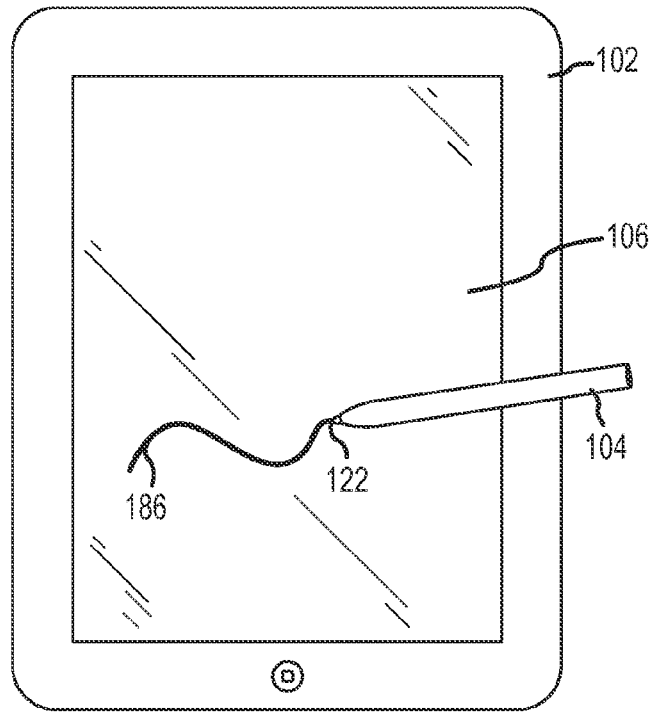
FIG. 8B is a top plan view of the computing device receiving an input from the input device with the second force provided to the nib.

In operation, and with reference to FIGS. 8A and 8B, as the force provided to the nib 122 varies, the stylus 104 may provide varying input to the computing device 102. For example, even though the capacitive input provided to the touch screen 106 might not change as between two forces $F_1$, $F_2$, the stylus 104 may sense a different contact point $C_1$, $C_2$, of the inner shaft 180 and may provide a signal indicative of the contact point position to the computing device 102 through, for example, near field communication, WiFi, etc., as mentioned above.

FIG. 8A is a top plan view of the computing device 102 receiving an input from the stylus 104 with a first force provided to the nib 122. With reference to FIGS. 6A, 7A, and 8A, a relatively small force may be exerted on the nib 122. As shown in FIG. 8A, the stylus 104 may provide an input of a first line 184 and the computing device 102 may display that first line on the computing device 102. The first line 184 may have a first width or thickness, which may be relatively narrow. However, as the force provided to the nib varies, the thickness of the line input to the computing device 102 may also vary. In some instances, as the force provided to the nib 122 varies, other characteristics of the input to the computing device 102 may vary—for example, an increased force may be input to the computing device 102 as a different color, or a different brush tip. Generally, the input characteristic may vary depending on the pressure applied to the nib 122.

FIG. 8B is a top plan view of the computing device 102 receiving an input from the stylus 104 with a second force provided to the nib 122, with the first force being greater than the second force (e.g., more pressure is applied to the nib 122). With reference to FIGS. 6B, 7B, and 8B, as the user causes more force to be exerted on the nib 122 (e.g., by pressing the stylus 104 harder against the touch screen 106), the stylus 104 may provide an input of a second line 184 and the computing device 102 may display that second line 186 on the computing device 102. The second line 186 may have a second width or thickness, which may be greater than the width or thickness of the first line 184.

Although the output lines 184, 186 are discussed herein as having varying widths or thicknesses, in other embodiments, the output thickness may be the same, but the flexibility of the nib may provide an enhanced user experience, as the stylus may have a more realistic feel. Alternatively, the outputs based on the force on the nib 122 may be otherwise varied, such as varying the output color, an input command to the computing device 102, and so on. For example, when a first, light force is exerted relative to the computing device 102, the computing device 102 may perform a first action (e.g., draw something), whereas when a second, more intense force is exerted, the computing device 102 may perform a second, different action (e.g., erase something).

Figure 9A:
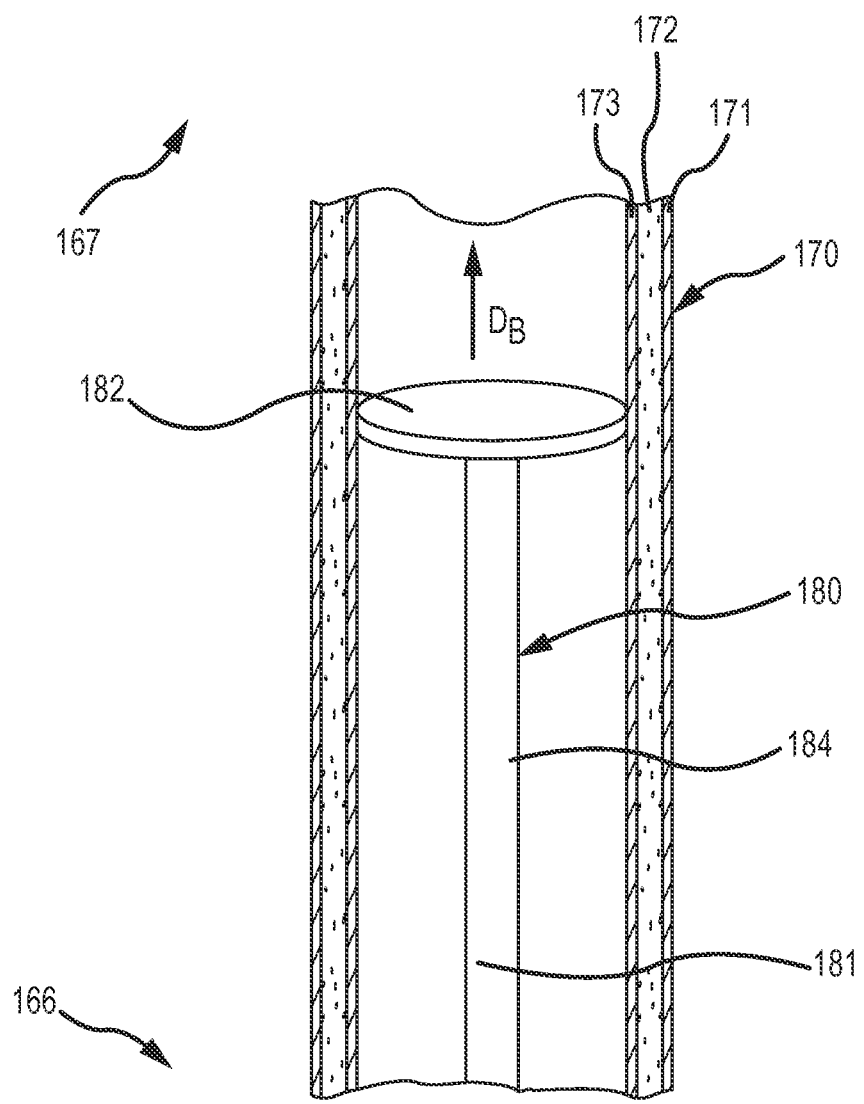
FIG. 9A is a partial cross-section view of the first embodiment of the input device of FIG. 4 taken along line 9-9 in FIG. 4, with the first force provided to the nib.

With reference now to FIG. 9A (and referring back to FIGS. 6A, 6B), one example of a stylus 104 will be described in more detail. As illustrated in FIG. 9A, the outer housing 170 may include a plurality of layers and/or surfaces. For example, the outer housing 170 may include an outer surface 171, which may be conductive (for example aluminum), and as described above may be coupled to the nib 122 such that capacitance is shared between the nib 122 and a user's hand that is in contact with the outer surface 171. The outer housing 170 may also include an insulation layer 172, that may insulate the outer surface 171 from the inner surface 173, and vice versa. The inner surface 173 of the outer shaft 180 may also be conductive and/or resistive in some embodiments.

One or more of the inner surface 173 of the outer housing 170 and the outer surface 181 of the inner shaft 180 may be coated with or at least partially formed from an electrically conductive but resistive material (such as carbon, cermet, etc.), which may in essence form part of a potentiometer within the stylus 104. The resistance of the material may vary (e.g., linearly, logarithmically, etc.) according to a contact distance relative to an electrical connection on the material. In some embodiments, a resistive material may be provided that is nearly the entire circumference of the inner surface 173 of the outer housing 170 or the outer surface 181 of the inner shaft 180. In other embodiments, multiple strips (e.g., 2, 3, 4, 5, 6, 7, 8, 9, 10, 15, 20, etc.) of resistive material may be provided, which may facilitate determining an orientation of the stylus 104 relative to gravity.

As just one example, if: the inner wall 173 of the outer housing 170 is coated with a resistive material whose contact resistance varies linearly along the length of the inner wall 173 (with respect to an electrical connection at one end of the inner wall 173); the inner shaft 180 is composed of a conductive material; a substantially constant current or voltage source is coupled to a first end 167 of the outer housing 170; and a reference voltage node (e.g., ground) is coupled to the other end 166 of the outer housing 170, then the stylus may function as a three terminal potentiometer with the contact point of the inner shaft 180 (e.g., the top portion 182) acting as the wiper terminal for the potentiometer. If the voltage of the inner shaft 180 is measured (e.g., by an analog to digital converter or other voltage sensor), Ohm's law can be employed to determine the location of the connection with the outer housing 170 if certain characteristics of the resistive material are known (e.g., does it vary linearly or logarithmically with distance). The top portion 182 in this example may be a depth plunger because it essentially helps determine the depth of the top portion 182 of the inner shaft 180 within the outer housing 170. In this example, the inner shaft 180 may be biased in a biasing direction DB that is generally axial to the outer housing 170, which may cause the inner shaft 180 to slide within the outer housing 170.

It will be understood that many different electrical circuit variations may be employed together with the structure of the stylus 104 set forth herein to help determine a magnitude of a force exerted on the nib 122, as indicated by a contact point of the inner shaft 180 within the outer housing 170. For example, the constant current source could be applied to the second end 166 of the outer housing 170 rather than the first end 167. Also, a substantially constant voltage source may be used in place of the substantially constant current source, in which case inner shaft 180 may act as a voltage divider relative to the inner surface 173 of the outer housing 170. As still another example, a constant current or voltage source could be provided to one end of the inner shaft 180 rather than or in addition to providing the source to the outer housing 170. In some embodiments, no constant current or voltage source is needed, and a circuit in the pre-processor circuit 198 of the stylus 104 may take a variable resistance provided by the inner shaft 180 and/or outer housing 170 and may determine a contact point within the outer housing 170 by measuring how long it takes a capacitance to charge and/or discharge through the variable resistance (essentially using two terminals of a potentiometer to create a variable resistance). In general, many different measurement nodes and reference voltages, nodes and currents may be employed to help generate one or more signals indicative of force applied to the nib 122 of the stylus 104 as measured by the interaction between the inner shaft 180 and the outer housing 170 of the stylus 104.

Figure 9B:
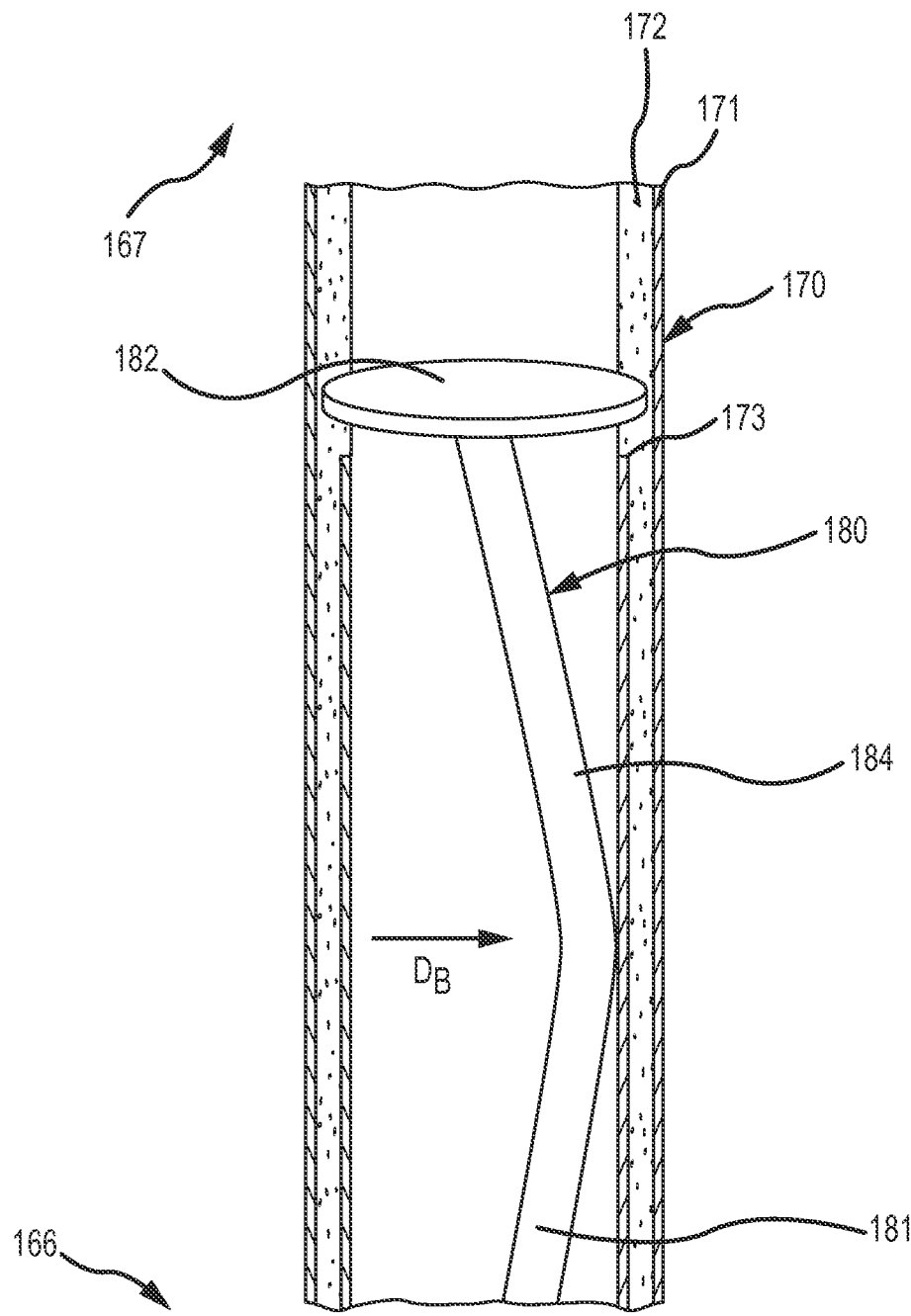
FIG. 9B is a partial cross-section view of the second embodiment of the input device of FIG. 4 taken along line 9-9 in FIG. 4, with the first force provided to the nib.

With reference to FIG. 9B (and referring back to FIGS. 7A and 7B), and as another example, the top portion 182 of the inner shaft 180 may be lodged in the insulation layer 172 of the stylus 104, thereby preventing movement of the top portion 182 relative to the outer housing 170. In this example, the inner shaft 180 may be biased in a biasing direction $D_B$ that is generally perpendicular to the outer housing 170, which may cause the inner shaft 180 to bend and contact the inner surface 173 of the outer housing 170. As with FIG. 9A, the contact may be an electrical contact.

Figure 9C:
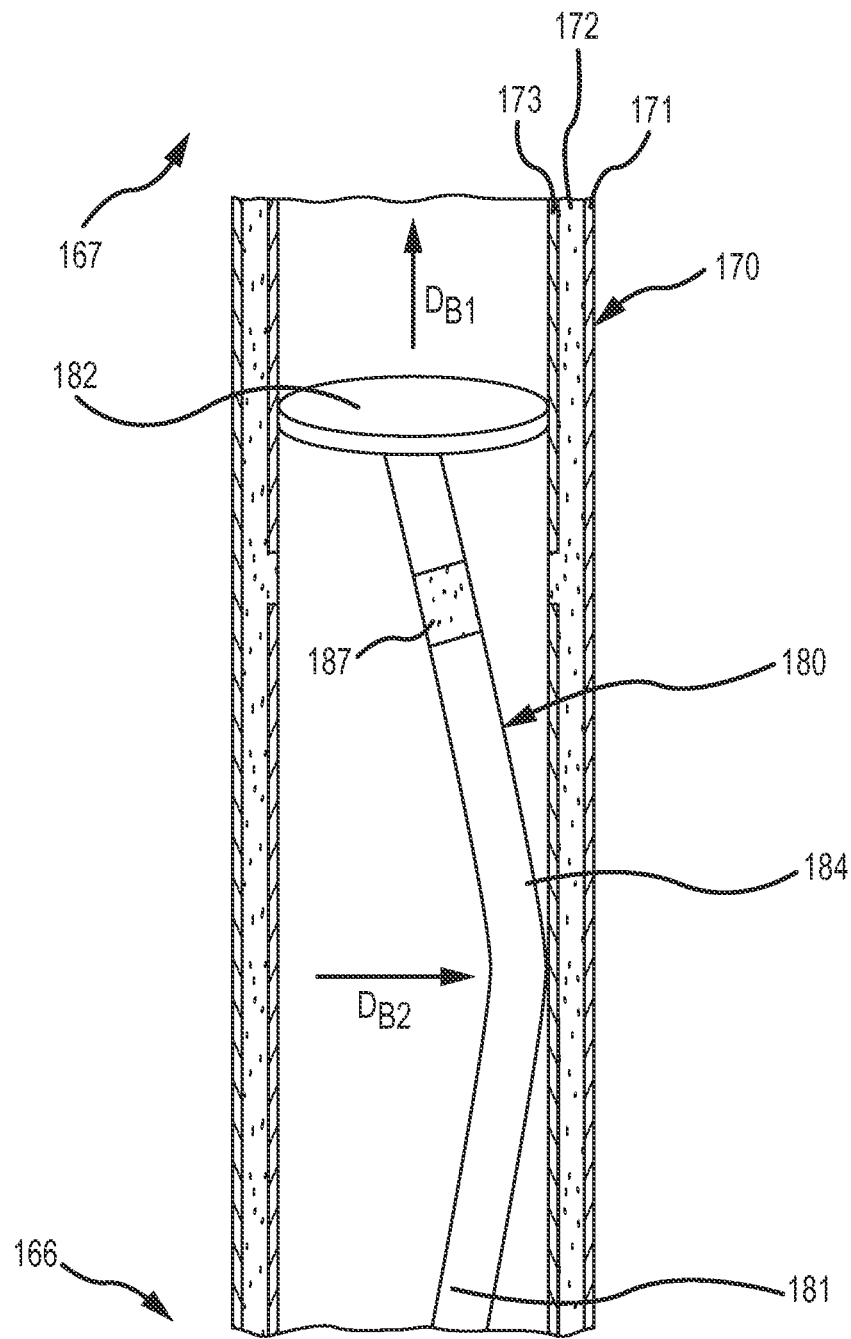
FIG. 9C is a partial cross-section view of a third embodiment of the input device of FIG. 4 taken along line 9-9 in FIG. 4, with the first force provided to the nib.

Referring now to FIG. 9C (and referring back to FIGS. 6A, 6B, 7A, 7B), in some embodiments, the inner shaft 180 of the stylus 104 may be configured to be biased in two biasing directions $D_{B1}$, $D_{B2}$. In these embodiments, the inner shaft 180 may include an insulator 187, and the inner surface 173 of the outer housing 170 may be separated by a portion of the insulation layer 173 in order to form two, electrically isolated circuits both for measurement of the sliding movement of the top portion 182 of the inner shaft and for measurement of the bending movement of the core of the inner shaft 180. In generally, using both axial and bending movement of the inner shaft 180 to determine a force exerted on the nib 122 may be more accurate in some instances than either alone.

Referring still to FIG. 9C, when two electrically isolated circuits are used, measurements may be taken by one or more sensors in series and/or in parallel. In examples where parallel measurements are taken by between the two circuits, a diode may be included in the path of one circuit (e.g., in the pre-processor circuit 198 and/or in the inner shaft 180) in order to reduce the number of measurement or sensor nodes needed that are needed to take two independent measurements of voltage, current, resistance, etc. in the two circuits.

Figure 9D:
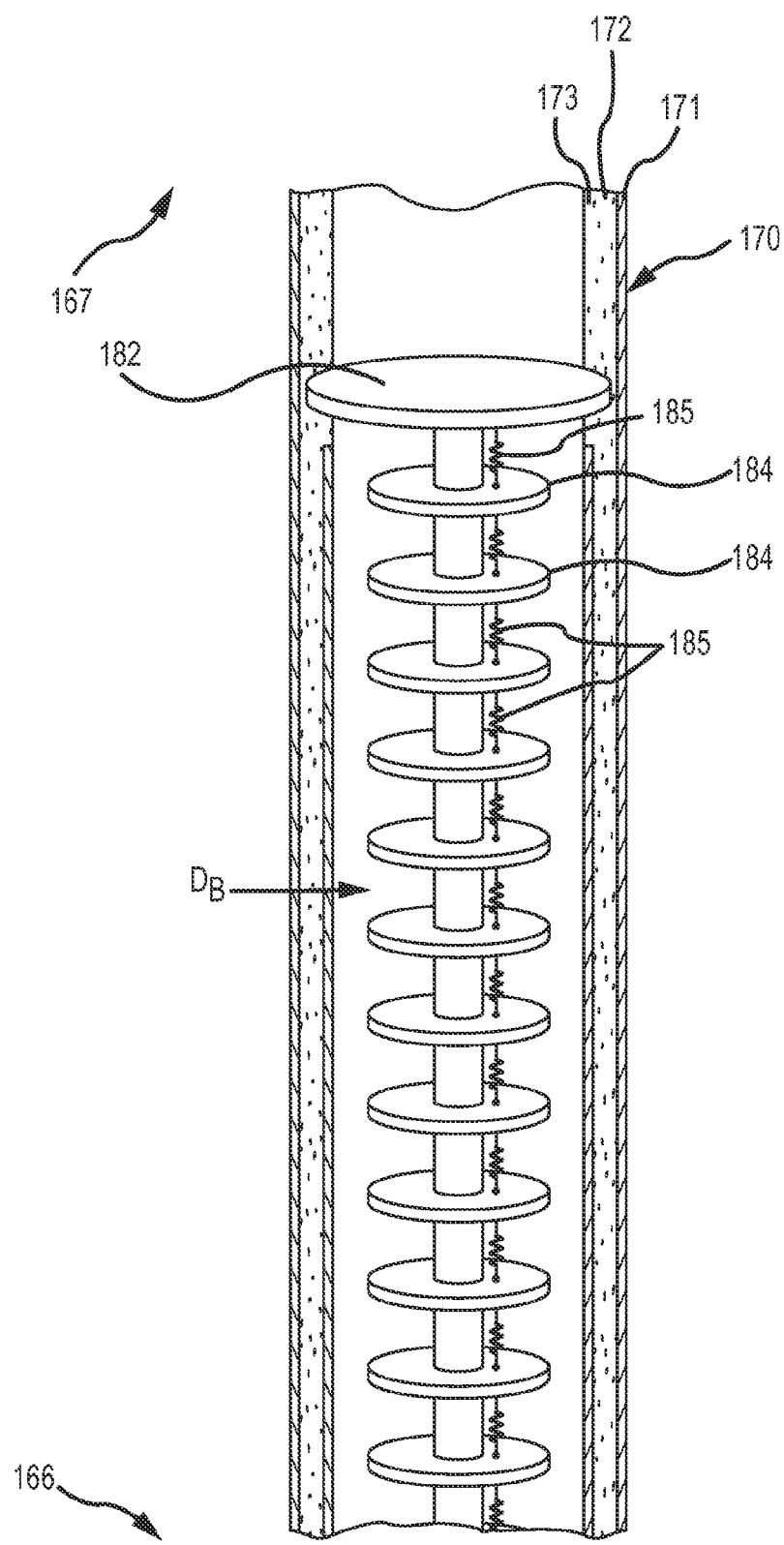
FIG. 9D is a partial cross-section view of a fourth embodiment of the input device of FIG. 4 taken along line 9-9 in FIG. 4, with the first force provided to the nib.

With reference to FIG. 9D, an alternative implementation will now be described. The inner shaft 180 illustrated in FIG. 9D may be similar to those described above, but may additionally include a plurality of disks 184 that are electrically conductive. The diameter of the disks 184 may generally be 60-95% the diameter of the inner surface 173 of the outer housing 170. A plurality of resistances 185 may be coupled between the electrically conductive plates 184, and the core of the inner shaft 180 may be composed of an insulative material. In some embodiments, each of the resistances 185 may have a unique resistance value (e.g., 1 M-ohm, 500 K-ohm, etc.), whereas in other embodiments, one or more of the resistances 185 may have similar resistance values.

In operation, the inner shaft 180 illustrated in FIG. 9D functions much like the inner shaft 180 illustrated in FIG. 9B in that a force applied to the nib 122 of the stylus 104 causes the inner shaft 180 to bend towards the inner surface 173 of the outer housing 170 in a biasing direction $D_B$. However, before the core of the inner shaft 180 is able to contact the outer housing 170, one or more of the conductive disks 184 may contact the inner surface 173 of the outer housing 170. In this manner, relatively clean measurements (of, e.g., resistance, voltage, current) may be obtained by a sensor coupled to the inner shaft 180 because the resistances 185 may be discrete and the contact point(s) of the conductive disks 184 may discretely contact the outer housing 170.

Additional Considerations and Functionality

It should be noted that the input device described herein need not be used with a touch screen. Insofar as the input device may communicate wirelessly or otherwise with an associated computing device, the input device may be used on surfaces other than a touch-sensitive surface. For example, the input device may be used on paper, glass, canvas or any other material. The force-sensing properties would continue to operate as described herein. Further, since the position of the nib and/or shaft may vary as the nib runs or moves over a textured surface, the input to the associated computing device may vary correspondingly. When paired with appropriate software, this may permit an associated output to be influenced by the surface over which the nib moves. For example, a roughened surface may cause the stylus to experience variations in force, which may translate to a variable thickness output line as the nib moves.

Software may be configured to minimize or ignore miniscule changes in force exerted on the nib, so that very small variations are factored out. Likewise, software may be configured to enhance such variations, to provide a different output aesthetic than would otherwise be experienced from moving the input device across a given surface.

Input generated by motion of the input device may vary with the stroke of the input device. That is, the direction of stroke and surface on which a stroke is performed may vary the characteristics of an input, thereby varying the output.

When combined with position-sensing sensors, such as an internal accelerometer, gyroscope, and the like, embodiments described herein may be used to interact with computing devices in different and unique ways. Position sensing of the input device permits it to be used in a fashion similar to a pen or other writing utensil without requiring a specialized tracking surface to monitor the input device's position. Further, when combined with handwriting recognition software, the input device may permit written input for a computing system.

CONCLUSION

The foregoing description has broad application. For example, while examples disclosed herein may focus on stylus embodiments, it should be appreciated that the concepts disclosed herein may equally apply to substantially any other type of input device. Similarly, although the input device and receiving unit may be discussed with capacitive touch screens, the devices and techniques disclosed herein are equally applicable to other types of capacitive coupling systems and other, non-capacitive touch screens, and more generally to many types of haptic systems. Moreover, although the electrical circuits created by the structure of the styli described herein have primarily been described with reference to resistive-type measurement implementations, it will be understood that styli with capacitive-type or inductive-type measurement implementations are also within the scope of this disclosure and the appended claims. Accordingly, the discussion of any embodiment is meant only to be exemplary and is not intended to suggest that the scope of the disclosure, including the claims, is limited to these examples.

What is claimed is:

1. An input device for computing devices comprising:
an outer housing having an inner surface that provides a variable resistance;
an inner shaft at least partially received within the outer housing;
a nib operatively coupled to the inner shaft; wherein
providing a first force to the nib causes the inner shaft to contact the inner surface at a first contact point along the outer housing;
providing a second force to the nib causes the inner shaft to contact the inner surface of the outer housing at a second contact point along the outer housing, wherein the first and second contact points are at different locations along a length of the outer housing, and wherein the input device generates a first electrical signal in response to the inner shaft contacting the inner surface of the outer housing at the first contact point and generates a second electrical signal in response to the inner shaft contacting the inner surface of the outer housing at the second contact point, and
a circuit that measures the first and second forces provided to the nib by measuring capacitance discharges across the variable resistance of the inner surface when the inner shaft contacts the inner surface at the first and second contact points.

2. The input device of claim 1, wherein the inner shaft comprises an outer surface, and the outer surface of the inner shaft contacts the inner surface of the outer housing responsive to the first and second forces.

3. The input device of claim 1, wherein the outer surface of the inner shaft selectively forms an electrical connection at the first and second contact points of the outer housing.

4. The input device of claim 1, wherein the first force causes the inner shaft to bend at a first bend point along the inner shaft, the first bend point being coupled to the first contact point responsive to the first force.

5. The input device of claim 1, wherein the inner shaft comprises a conductive element, and wherein the input device further comprises a substantially constant voltage source coupled to a first portion of the inner surface.

6. The input device of claim 5, wherein a second portion of the inner surface is coupled to a reference voltage node.

7. The input device of claim 1, wherein the inner surface is a resistive element that provides the variable resistance.

8. The input device of claim 7, wherein the variable resistance of the inner surface increases along the length of the outer housing.

9. An apparatus comprising:
an inner shaft having first and second opposing ends and including an electrically conductive portion at the first end, wherein the inner shaft extends between the first and second opposing ends along a longitudinal axis;
a nib operatively coupled to the second end of the inner shaft and configured to bias the inner shaft in a biasing direction within a rigid housing; and
a plurality of parallel conductive disks attached to the inner shaft along the longitudinal axis between the electrically conductive portion and the nib, wherein each of the conductive disks makes electrical contact with an inner surface of the rigid housing at a respective location of the rigid housing along the longitudinal axis, wherein the biasing direction is orthogonal to the longitudinal axis.

10. The apparatus of claim 9, wherein at least a portion of the inner shaft is flexible.

11. The apparatus of claim 10, wherein the nib is configured to bias the flexible inner shaft responsive to a first force such that a first one of the plurality of parallel conductive disks makes electrical contact with the inner surface at a first location along the longitudinal axis, and wherein the nib is further configured to bias the flexible inner shaft responsive to a second force greater than the first force such that a second one of the plurality of parallel conductive disks makes electrical contact with the inner surface at a second location along the longitudinal axis.

12. The apparatus of claim 9, wherein the inner shaft comprises an outer surface, and the outer surface comprises the electrically conductive portion.

13. The apparatus of claim 9, wherein the inner shaft comprises a depth plunger.

14. The apparatus of claim 9, wherein a plurality of resistances are coupled between the plurality of parallel conductive disks.

15. A stylus for providing an input to a touch interface of a computing device, comprising: an elongated body; a nib operably coupled to the elongated body; and an inner shaft operably coupled to the nib and at least partially received within the elongated body, wherein the inner shaft comprises an insulator and a conductive disc that contacts an inner surface of the elongated body; wherein movement of the nib causes a portion of the inner shaft interposed between the nib and the insulator to bend towards and make direct electrical contact with the inner surface of the elongated body and causes the conductive disc to slide along and make direct electrical contact with the inner surface of the elongated body.

16. The stylus of claim 15, wherein the stylus is configured to provide a signal indicative of a location of the direct electrical contact between the portion of the inner shaft and inner surface of the elongated body.

17. The stylus of claim 15, wherein the movement of the nib is radial movement relative to the elongated body.

18. The stylus of claim 15, wherein the nib is electrically coupled to an outer surface of the elongated body and the stylus is configured for use with a capacitive touch interface.

19. A method for operating an input device for a computing device, comprising:

determining first and second contact positions at which an inner shaft makes direct electrical contact with an outer housing having an inner surface that provides a variable resistance, the first and second contact positions varying responsive to a force provided to the nib such that the inner shaft makes direct electrical contact with the inner surface at the first contact position in response to a first force and the inner shaft makes direct electrical contact with the inner surface at the second contact position in response to a second force that is different than the first force;

with a circuit in the input device, measuring the first and second forces provided to the nib by measuring capacitance discharges across the variable resistance of the inner surface when the inner shaft contacts the inner surface at the first and second contact positions; and providing a first output signal responsive to the first contact position and providing a second output signal responsive to the second contact position.

20. The method of claim 19, wherein the first output signal provided responsive to the first contact position increases in magnitude as the force applied to the nib increases.

21. The method of claim 19, further comprising transmitting the first output signal to the computing device.

22. The method of claim 19, wherein the first contact position of the inner shaft with the inner surface is determined by voltage dividing a voltage applied to the inner surface through a wiper, the wiper comprising the inner shaft.

23. The method of claim 19, further comprising determining an orientation of the input device relative to the computing device and transmitting the orientation to the computing device.

* * * * *